(No Model.)

H. B. BROWN.
LEMON JUICE EXTRACTOR.

No. 464,954. Patented Dec. 15, 1891.

Witnesses

Inventor
Harrison B. Brown
By G. L. Browne
his Attorney

UNITED STATES PATENT OFFICE.

HARRISON B. BROWN, OF WASHINGTON, DISTRICT OF COLUMBIA, ASSIGNOR OF ONE-HALF TO W. W. DUDLEY AND F. L. BROWNE, BOTH OF SAME PLACE.

LEMON-JUICE EXTRACTOR.

SPECIFICATION forming part of Letters Patent No. 464,954, dated December 15, 1891.

Application filed May 11, 1891. Serial No. 392,350. (No model.)

*To all whom it may concern:*

Be it known that I, HARRISON B. BROWN, a citizen of the United States, residing at Washington, in the District of Columbia, have invented certain new and useful Improvements in Lemon-Juice Extractors; and I do hereby declare the following to be a full, clear, and exact description of the invention, such as will enable others skilled in the art to which it appertains to make and use the same.

This invention is in the nature of a device for extracting juice from a lemon, and has for its object to overcome certain objections to the device as now made; and the invention consists in an integrally-formed device having a suitable base, an annular trough, and a central conoidal projection provided with spaces so arranged that free passage is provided for the liberated juices from the beginning of the operation.

The invention further consists in the special construction hereinafter fully described, and shown by the accompanying drawings, in which—

Figure 1:
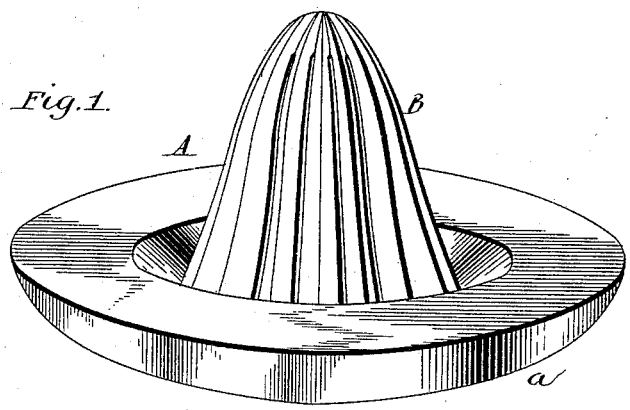
Figure 2:
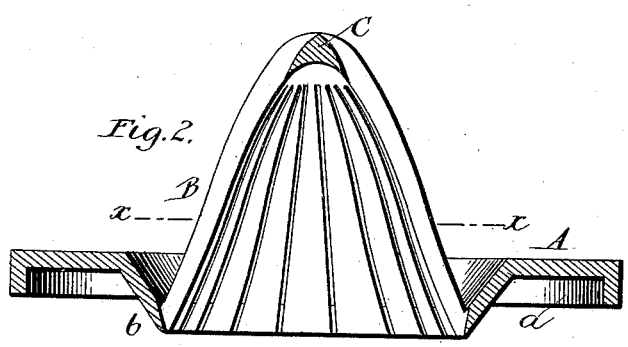
Figure 3:
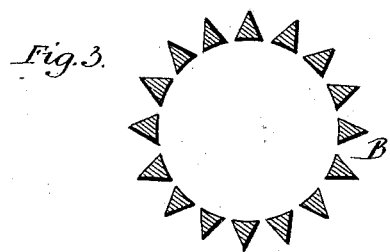

Figure 1 is a view in perspective of my improved device. Fig. 2 is a vertical central section of the same; and Fig. 3 a horizontal section taken on the line $x\ x$, Fig. 2.

In the drawings, A denotes the base, which may or may not be provided with a depending flange $a$ at its outer periphery to serve as a guard preventing the device slipping from the vessel upon which it is placed. This base near the center inclines downwardly and inwardly, as at $b$, and from the lower edge thereof upwardly converge a series of fingers B, conoidally arranged and made integral with a solid portion C at their upper ends, as shown by the drawings. These fingers may be formed in any desired cross-section so long as their outer sides have reaming-edges; but I, however, prefer the triangular shape shown by the drawings. By this construction it will be seen that the straining-slot between the fingers extends from the bottom of the depression in the base up to the apex of the cone formed by the fingers, and thus obviates the objection lemon-extractors now possess—*i. e.,* becoming stopped by small seeds and pithy substance.

A further advantage my device possesses is the free passage of the juice through the reamer at the top and not running down the side and mixing with the pulp and seeds in the base, and consequently losing a large per cent. thereof.

I am aware that lemon-squeezers have been made in one piece, having a base, a conoidal projection consisting of a solid shell with projections on the sides and the base provided with juice-exits, and do not claim such construction. I am also aware of the existence of an extractor having the cone and base formed in separate pieces, the cone being a solid shell with short slots near the bottom, and make no claim to such construction; but What I do claim, and desire to secure by Letters Patent, is—

A fruit-squeezer consisting of a base formed with an annular trough and a conoidal projection formed integrally therewith, said projection being constituted of a series of juxtaposed fingers triangular in their cross-section extending upward from the base and joined together at their upper ends, the lower ends of these fingers forming the inner wall of the trough and whereby are formed a series of slots or openings between the fingers which extend from the bottom of the trough to a point near the apex of the projection, for the purposes set forth.

In testimony whereof I affix my signature in presence of two witnesses.

HARRISON B. BROWN.

Witnesses:
WILL T. NORTON,
ARTHUR BROWNING.